(12) United States Patent
Satoh et al.

(10) Patent No.: US 9,013,544 B2
(45) Date of Patent: Apr. 21, 2015

(54) IMAGE CAPTURE SYSTEM AND IMAGING OPTICAL SYSTEM

(71) Applicants: Hiroyuki Satoh, Yokohama (JP); Noriyuki Terao, Sendai (JP); Yoshiaki Irino, Kawasaki (JP); Tomonori Tanaka, Yokohama (JP); Nozomi Imae, Yokohama (JP); Toru Harada, Kawasaki (JP); Hirokazu Takenaka, Kawasaki (JP); Hideaki Yamamoto, Yokohama (JP); Kensuke Masuda, Kawasaki (JP); Satoshi Sawaguchi, Yokohama (JP); Daisuke Bessho, Kawasaki (JP); Makoto Shohara, Hachioji (JP); Yoichi Ito, Machida (JP); Shusaku Takasu, Yokohama (JP)

(72) Inventors: Hiroyuki Satoh, Yokohama (JP); Noriyuki Terao, Sendai (JP); Yoshiaki Irino, Kawasaki (JP); Tomonori Tanaka, Yokohama (JP); Nozomi Imae, Yokohama (JP); Toru Harada, Kawasaki (JP); Hirokazu Takenaka, Kawasaki (JP); Hideaki Yamamoto, Yokohama (JP); Kensuke Masuda, Kawasaki (JP); Satoshi Sawaguchi, Yokohama (JP); Daisuke Bessho, Kawasaki (JP); Makoto Shohara, Hachioji (JP); Yoichi Ito, Machida (JP); Shusaku Takasu, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/503,032

(22) Filed: Sep. 30, 2014

(65) Prior Publication Data

US 2015/0015766 A1    Jan. 15, 2015

Related U.S. Application Data

(63) Continuation of application No. 14/021,073, filed on Sep. 9, 2013.

(30) Foreign Application Priority Data

Sep. 11, 2012    (JP) ................................ 2012-199770

(51) Int. Cl.
*H04N 7/00* (2011.01)
*H04N 5/232* (2006.01)
(Continued)

(52) U.S. Cl.
CPC ............ *H04N 5/23238* (2013.01); *G02B 13/06* (2013.01); *G02B 13/0065* (2013.01); *G02B 17/08* (2013.01)

(58) Field of Classification Search
CPC .. G02B 13/06; G02B 17/023; G02B 13/0065; G02B 17/08; H04N 5/2253; H04N 5/2254; H04N 5/23238; G03B 17/17; G03B 37/04
USPC .......................................................... 348/36
See application file for complete search history.

(56) References Cited

U.S. PATENT DOCUMENTS 5,301,435 A  *  4/1994  Buckley ......................... 33/293
5,990,941 A     11/1999  Jackson et al.
(Continued)

FOREIGN PATENT DOCUMENTS

GB    2385840     9/2003
JP    63-55217    4/1988
(Continued)

OTHER PUBLICATIONS

U.S. Appl. No. 13/795,453, filed Mar. 12, 2013.
(Continued)

*Primary Examiner* — Anner Holder
(74) *Attorney, Agent, or Firm* — Oblon, McClelland, Maier & Neustadt, L.L.P.

(57) ABSTRACT

An optical system includes a first lens to focus incident light, a first prism including a reflection surface by which light having transmitted through the first lens is reflected, a second lens to focus incident light from a different direction from a direction of the incident light on the first lens, and a second prism including a reflection surface by which light having transmitted through the second lens is reflected, in which the reflection surface of the first prism and the reflection surface of the second prism oppose each other.

6 Claims, 11 Drawing Sheets

(51) Int. Cl.
　　*G02B 13/06* (2006.01)
　　*G02B 13/00* (2006.01)
　　*G02B 17/08* (2006.01)

(56) References Cited

U.S. PATENT DOCUMENTS

| | | | |
|---|---|---|---|
| 6,795,113 | B1 | 9/2004 | Jackson et al. |
| 7,382,399 | B1* | 6/2008 | McCall et al. ............ 348/207.99 |
| 2003/0007793 | A1* | 1/2003 | Suzuki ............................ 396/20 |
| 2009/0201791 | A1 | 8/2009 | Hotta |
| 2009/0225443 | A1* | 9/2009 | Toyoda et al. ................. 359/737 |
| 2012/0075448 | A1* | 3/2012 | Namii et al. .................... 348/68 |
| 2013/0050405 | A1 | 2/2013 | Masuda et al. |
| 2013/0050408 | A1 | 2/2013 | Masuda et al. |
| 2014/0071226 | A1 | 3/2014 | Satoh et al. |

FOREIGN PATENT DOCUMENTS

| | | |
|---|---|---|
| JP | 04-338705 | 11/1992 |
| JP | 2001-154152 | 6/2001 |
| JP | 3290993 | 3/2002 |
| JP | 2005-210651 | 8/2005 |
| JP | 2007-511117 | 4/2007 |
| JP | 2009-205775 | 9/2009 |
| JP | 2010-271675 | 12/2010 |
| JP | 2013-025255 | 2/2013 |
| JP | 2014-56048 | 3/2014 |
| WO | WO 01/68540 | 9/2001 |
| WO | WO2013/015431 A1 | 1/2013 |

OTHER PUBLICATIONS

Japanese Office Action mailed Nov. 4, 2014 for Japanese Patent Application No. 2014-200931.

* cited by examiner

IMAGE CAPTURE SYSTEM AND IMAGING OPTICAL SYSTEM

CROSS-REFERENCE TO RELATED APPLICATIONS

The present application is a continuation application of U.S. patent application Ser. No. 14/021,073, filed on Sep. 9, 2013 which is based on and claims priority from Japanese Patent Application No. 2012-199770, filed on Sep. 11, 2012, the disclosures of each of which are hereby incorporated by reference herein in their entirety.

BACKGROUND

1. Field of the Invention

The present invention relates to an image capture system and an omnidirectional image capture system in particular, and to an imaging optical system used therein.

2. Description of the Related Art

As image capture systems which "simultaneously take an image" in omnidirections, those using two wide-angle lenses are known (refer to Japanese Patent Application Publication Number 2010-271675 and Japanese Patent Number 3290993).

Such an omnidirectional image capture system can simultaneously acquire image information in all directions (in a solid angle of 471 radian), and therefore can be effectively used for a security monitoring camera, a vehicle-mounted camera, or the like.

For example, for coverage of news and the like, extremely accurate and fair image information can be recorded by using a small-sized omnidirectional image capture system in a "hand-held condition".

An image of a weather state in the omnidirections can be taken and applied to an analysis for weather information.

In addition, an image of landscape information can be taken and applied to the use in advertisement and promotion of the art field.

In such an image capture system, two wide-angle lenses each having a field angle exceeding 180 degrees (what is called a "fisheye lens") are used in combination.

Images taken by the respective wide-angle lenses are converted into electric signals by the same or individual imaging device and the electric signals are processed, so that an image in the omnidirections can be taken.

Neither of Japanese Patent Application Publication Number 2010-271675, and Japanese Patent Number 3290993 disclose the specific configuration of the wide-angle lens itself.

Moreover, in the image capture systems described in these patent documents and the like, each image formation light flux by each of the imaging optical systems is guided to an imaging device by an individual light-guide device (route changing device or reflection optical equipment).

As described above, because the light-guide device is used for each wide-angle lens, it is difficult to reduce a "distance between maximum field angles" of the two wide-angle lenses. The "distance between maximum field angles" will be described later.

When two wide-angle lenses each having a field angle exceeding 180 degrees are combined, a space portion where maximum field angle light fluxes entering the respective wide-angle lenses are not overlapped with each other is present.

An image of an object present in the "space portion where maximum field angle light fluxes entering the respective wide-angle lenses are not overlapped with each other" cannot be taken.

The "space portion" is hereinafter referred to as "imaging impossible space portion". It is needless to say that the imaging impossible space portion is preferably as small as possible.

It is difficult to reduce the imaging impossible space portion with the larger "distance between maximum field angles" mentioned above.

The larger field angles of the two wide-angle lenses to be combined are required for the reduced imaging impossible space portion in the image capture system having a larger distance between maximum field angles. This results in the severe design condition of lenses.

Moreover, with respect to an object which can be taken therein, parallaxes of an object in a maximum field angle and an object in an infinite distance differ. This results in a lager shift on the imaging element. This point also will be described later.

Japanese Patent Application Publication No. 2010-271675, and Japanese Patent No. 3290993 do not describe the specific configuration of the wide-angle lens, and not disclose such a problem of the imaging impossible space portion or a problem in parallax at all.

SUMMARY

The present invention aims to implement a novel omnidirectional image capture system capable of effectively solving the abovementioned problems.

According to one embodiment of the present invention, an optical system comprises a first lens to focus incident light, a first prism including a reflection surface by which light having transmitted through the first lens is reflected, a second lens to focus incident light from a different direction from a direction of the incident light on the first lens, and a second prism including a reflection surface by which light having transmitted through the second lens is reflected, wherein the reflection surface of the first prism and the reflection surface of the second prism oppose each other.

DETAILED DESCRIPTION OF THE PREFERRED EMBODIMENTS

Hereinafter, an embodiment will be described.

Figure 1:
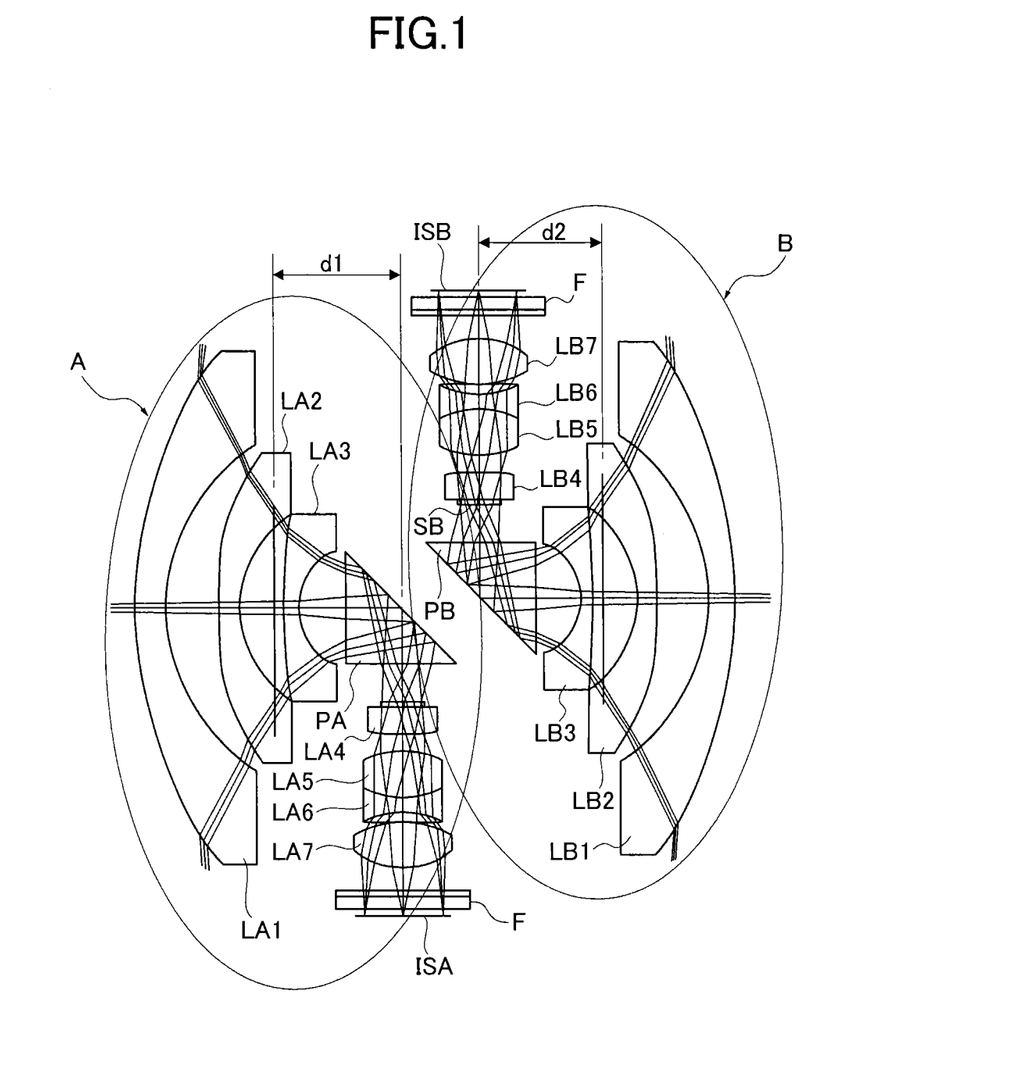
FIG. 1 is a view separately illustrating two imaging systems which constitute an image capture system.

FIG. 1 illustrates an example of two imaging systems which constitute an image capture system.

In other words, the two imaging systems which constitute the image capture system are an imaging system A and an imaging system B illustrated in the drawing. These imaging systems A, B have the same configuration.

Each of the two imaging systems A, B is configured to include "a wide-angle lens having a field angle larger than 180 degrees, and an imaging sensor for taking an image formed by the wide-angle lens".

The imaging sensor is a "two-dimensional solid imaging element".

The wide-angle lens of the imaging system A includes a front group, a reflection surface, and a rear group.

The "front group" is configured to include lenses LA1 to LA3, and the "rear group" is configured to include lenses LA4 to LA7. A reference numeral PA indicates a "right angle prism".

An aperture stop SA is disposed at an object side of the lens LA4.

The wide-angle lens of the imaging system B includes a front group, a reflection surface, and a rear group.

The "front group" is configured to include lenses LB1 to LB3, and the "rear group" is configured to include lenses LB4 to LB7. A reference numeral PB indicates a "right angle prism".

An aperture stop SB is disposed at an object side of the lens LB4.

The "front groups" of these two wide-angle lenses have a negative refractive power, and the "rear groups" thereof have a positive refractive power.

The right angle prisms PA, PB and the "reflection surface" will be described later.

"The lenses which constitute the front group" of the wide-angle lens in the imaging system A are configured in such a manner that three lenses as follows are arranged from the object side.

In other words, the lenses are the negative meniscus lens LA1 made of a glass material, the negative lens LA2 made of a plastic material, and the negative meniscus lens LA3 made of a glass material.

The lenses which constitute the rear group thereof are configured in such a manner that four lenses as follows are arranged from the aperture stop SA side.

In other words, the lenses are the biconvex lens LA4 made of a glass material, "the cemented lens of the biconvex lens LA5 and the biconcave lens LA6" which are made of a glass material, and the biconvex lens LA7 made of a plastic material.

"The lenses which constitute the front group" of the wide-angle lens in the imaging system B are configured in such a manner that three lenses as follows are arranged from the object side.

In other words, the lenses are, in order from the object side, the negative meniscus lens LB1 made of a glass material, the negative lens LB2 made of a plastic material, and the negative meniscus lens LB3 made of a glass material.

The lenses which constitute the rear group thereof are configured in such a manner that four lenses as follows are arranged from the aperture stop SB side.

In other words, the lenses are the biconvex lens LB4 made of a glass material, "the cemented lens of the biconvex lens LB5 and the biconcave lens LB6" which are made of a glass material, and the biconvex lens LB7 made of a plastic material.

In these imaging systems A, B, the negative lenses LA2 and LB2 and the biconvex lenses LA7 and LB7 which are made of a plastic material each have "both aspherical surfaces".

Further, the other lenses which are made of a glass material are spherical lenses.

Positions of front-side principal points in the wide-angle lenses are respectively set between the lenses LA2 and LA3 and between the lenses LB2 and LB3.

A distance from an intersection point between an optical axis of the front group and the reflection surface to the front-side principal point in each of the wide-angle lenses of the imaging systems A, B is indicated by "d1, d2" in FIG. 1.

Because the imaging systems A, B have the same configuration, d1=d2 is established.

The right angle prisms PA, PB may be preferably made of a "material having a refractive index for the d line more than 1.8". The right angle prisms PA, PB each "internal-reflect" light from the front group toward the rear group.

Accordingly, each optical path for an image formation light flux of each of the wide-angle lenses passes through the inside of each of the right angle prisms PA, PB.

The prism made of the material having a high refractive index as described above results in the "optically optical path length" in the right angle prism longer than an actual optical path length, thereby making it possible to increase a distance where a light beam is caused to be curved.

This allows "the optical path length between the front group and the rear group" in the front group, the right angle prism, and the rear group to be longer than a mechanical optical path length, thereby making it possible to configure the wide-angle lens in a small-sized manner.

Moreover, the right angle prisms PA, PB are disposed near the aperture stops SA and SB through which the diameter of the light flux is narrowed down, so that the right angle prisms of a small size can be used, thereby making it possible to decrease an interval between the wide-angle lenses.

In this manner, each of the right angle prisms PA, PB is disposed between the front group and the rear group.

The front group of the wide-angle lens has a function to take in a light beam "having a field angle larger than 180 degrees", and the rear group thereof effectively functions for "correction for aberration of an image-formed image".

An imaging sensor is disposed at the image side of the rear group in each of the wide-angle lenses. In FIG. 1, reference numerals ISA and ISB respectively indicate imaging surfaces of these imaging sensors.

A reference numeral F illustrated at the wide-angle lens side of each of the imaging surfaces ISA and ISB indicates various kinds of filters and covers used for the imaging sensor.

Incidentally, in FIG. 1, although the right angle prisms PA, PB are illustrated in a separate manner, this aims to clearly illustrate the configurations of the respective imaging systems A, B.

In the actual image capture system, inclined surfaces of the right angle prisms PA, PB which constitute parts of the wide-angle lenses of the respective imaging systems A, B are in contact with each other.

The "reflection surfaces" in the respective wide-angle lenses constitute a reflection film common to the two wide-angle lenses, and the reflection film is sandwiched by optically equivalent two transparent members (right angle prisms PA, PB).

In other words, a reflection film is formed between the inclined surfaces of the right angle prisms PA, PB, and this reflection film is sandwiched by the inclined surfaces of the right angle prisms PA, PB.

In this state, the reflection film and the right angle prisms PA, PB are made be integral and constitute "a reflection surface member common to the two wide-angle lenses".

Further, as is described later, the reflection surface member is held by a "common lens barrel mounted with the respective front groups and the respective rear groups" of the two wide-angle lenses.

Such a configuration enables the width in the incident light axis direction to be reduced in the imaging systems A, B.

An effect by such a configuration will be described.

Figure 2:
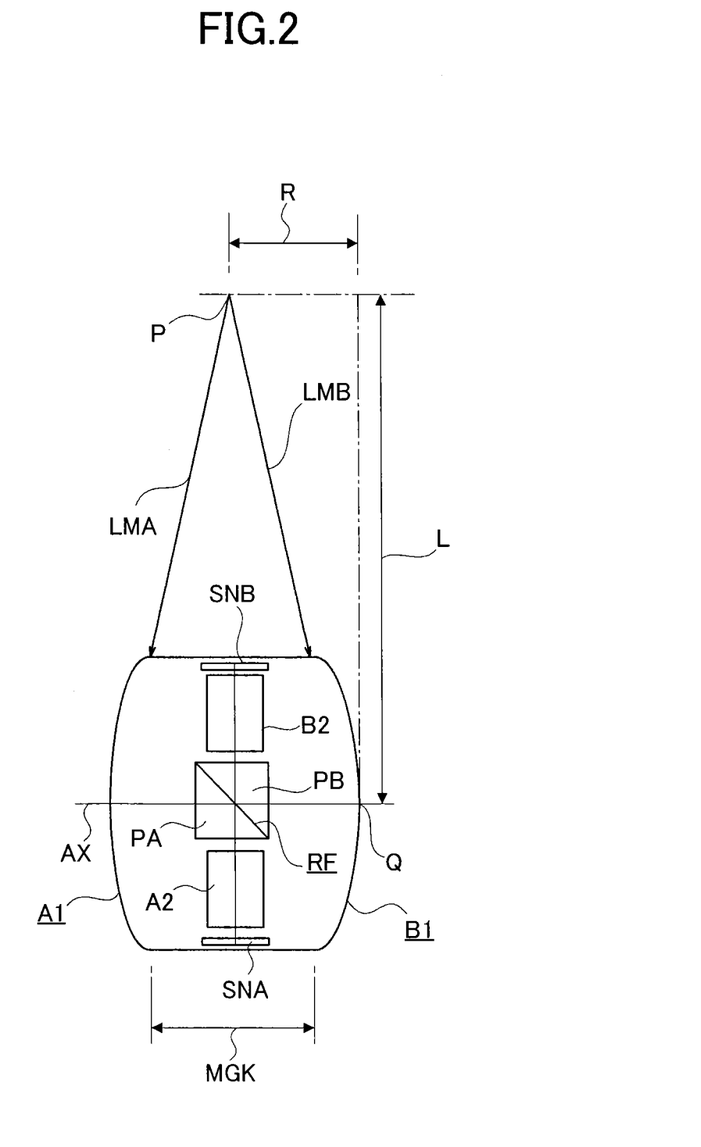
FIG. 2 is a view for explaining a parallax and an imaging impossible space.

FIG. 2 illustrates the image capture system in a simple manner.

In other words, In FIG. 2, reference numerals A1, B1 indicate, in the front groups of the two wide-angle lenses, "lens surfaces nearest to the object side (object side lens surfaces of the lenses LA1, LB1 in FIG. 1)".

Moreover, reference numerals A2, B2 indicate the rear groups of the two wide-angle lenses in a simple manner, and reference numerals SNA, SNB indicate the imaging sensors of the imaging systems A, B.

Reference numerals PA, PB indicate the right angle prisms, and a reference numeral RF indicates the "reflection surface".

A reference numeral LMA indicates a maximum field angle light beam which enters the wide-angle lens of the imaging system A at a maximum field angle, and a reference numeral LMB indicates a maximum field angle light beam which enters the wide-angle lens of the imaging system B at a maximum field angle.

An "intersection point" between the maximum field angle light beams LMA and LMB is set as P, and a distance between the point P and a plane which passes an intersection point position Q of the surface B1 nearest to the object side in the front group with an optical axis AX and is orthogonal to an incident light axis is set as "R".

Moreover, a distance between the intersection point position Q and a plane which passes the point P and is in parallel with the optical axis AX is set as "L".

In addition, a distance between incident light positions of the maximum field angle light beams LMA, LMB to the front groups is set as "MGK".

This distance: MGK indicates the "distance between maximum field angles" described above.

As is apparent from the drawing, a "space portion surrounded by the point P and the maximum field angle light beams LMA, LMB" is an "imaging impossible space portion" described above.

Neither of the two wide-angle lenses take in light emitted from an object present in the imaging impossible space portion as imaging light.

The omnidirectional image capture system can take an image of less information as the imaging impossible space portion becomes larger. Accordingly, an idea to reduce the size of the imaging impossible space portion is required.

The size of the imaging impossible space portion is featured by the distances: R and L and the distance between maximum field angles: MGK described above.

If any of these distances: R, L, and MGK increase, the imaging impossible space portion becomes large. Methods for reducing these distances are considered as follows.

The first method is a method of reducing the distance: L. To execute this method independently, the field angle of the wide-angle lens needs to be increased.

The increase of the field angle of the wide-angle lens results in severe constraint to a lens design, and the increase of the field angle results in the larger "parallax".

The second method is a method of reducing the distance: R.

When the field angle of the wide-angle lens is set to "θ", between the distances: R and L, the relationship expressed as follows is established.

$$L = -R \cdot \tan \theta$$

Accordingly, if the distance R is reduced, the distance: L where images photographed by the two wide-angle lenses becomes short, and the imaging impossible space portion also becomes small.

To reduce the distance: R, the distance between maximum field angles: MGK may preferably be reduced.

To reduce the distance between maximum field angles: MGK, as is the present embodiment, making the reflection surfaces included in the two wide-angle lenses of the imaging systems A, B be common is "the most effective".

The reflection film is sandwiched by the inclined surfaces of the right angle prisms PA and PB to be integrated with the right angle prisms PA, PB, which allows the distance between maximum field angles: MGK to be reduced and the distance: R to be reduced.

Here, the "parallax" will be described.

In the image capture system of the present embodiment, two images captured by the wide-angle lenses each having a field angle equal to or larger than 180 degrees are joined together by calibration to obtain an image of a solid angle: $4\pi$ radian.

The "parallax" described in the description means an "overlapping amount" of the two images joined together by calibration.

As for such an omnidirectional image capture system in the present embodiment, the joined "composite image" is influenced by the parallax and the "parallax of the maximum field angles" causes an image shift.

When the parallax is converted into an angle and is set as angle: θ, the parallax: θ has a functional relation with a distance to an object and the distance between maximum field angles: MGK.

As an example, when calibration is performed with a distance to an object: 20 cm, if the distance between maximum field angles is 35 mm, the parallax of an infinitely distant image is 5 degrees.

In other words, the infinitely distant image shifts by 5 degrees.

For example, when an imaging sensor of 5000000 pixels is used, the pixels are arranged in an array of 2592×1944 (pixels) in two directions orthogonal to each other.

An image is formed in this rectangular area region by the wide-angle lens, the diameter of the image (has a circular shape) becomes 1994 pixels, in other words, approximately 2000 pixels.

Assuming that the field angle of the wide-angle lens is 200 degrees, the number of pixels allocated to each degree is 2000 (pixels)/200 (degrees)=10 (pixels)/degrees.

In this case, "the parallax of 5 degrees" as described the above causes the infinitely distant image to be shifted by 50 pixels.

Figure 3:
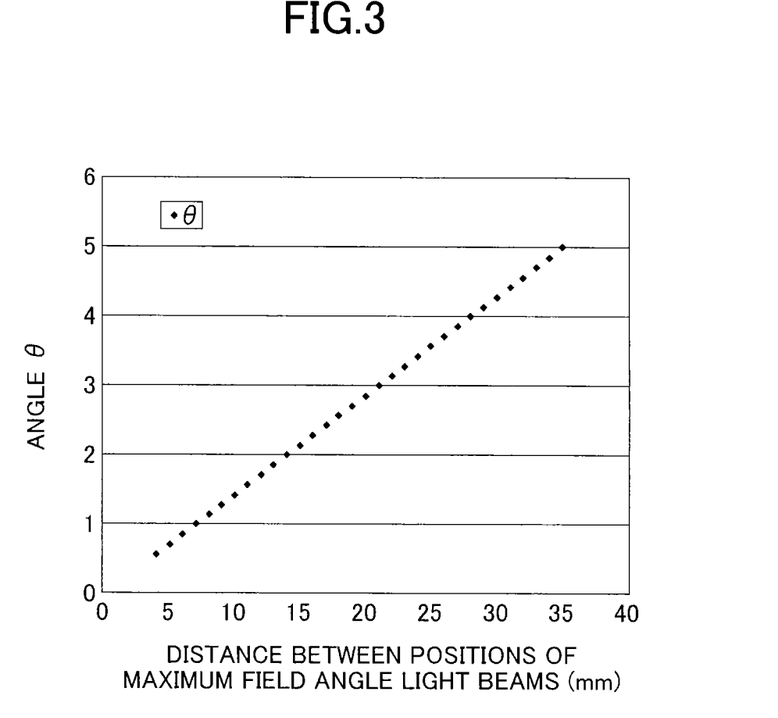
FIG. 3 is a graph illustrating a relation between a distance between maximum field angles and the parallax.

FIG. 3 illustrates change of the shift amount: θ of a joint of two images to be joined together, in the abovementioned case, when an imaging range from an object distance: 20 cm to the infinite distance is set.

The horizontal axis represents the distance between maximum field angles (which is indicated as a "distance between positions of the maximum field angle light beams" in the drawing).

The longitudinal axis represents a shift "angle: θ (that is "parallax")". As illustrated in the drawing, the shift angle: θ linearity increases proportional to the increase in the distance between maximum field angles.

The "overlapped region" of the joined two images increases with the larger parallax.

This results in the lower pixel density of "a portion from a surrounding part to an optical axis part" excluding the overlapped portion, which leads to the lower resolution of a composite image.

With the image capture system of the present embodiment, as described the above, the reflection surface member is configured such that a reflection film is sandwiched by the oblique sides of the right angle prisms PA, PB, and the reflection film and one right angle prism are integrally formed.

This makes a distance between the reflection surfaces of the two wide-angle lenses be 0, thereby reducing the distance between maximum field angles and decreasing the parallax.

A specific example relating to the wide-angle lens is described.

Data described below relate to the two imaging systems A, B illustrated in FIG. 1. Because the imaging systems A, B have "the same configuration", the following data are common to the respective imaging systems.

The distance: d1 indicates "a distance on the optical axis between an entrance pupil and the reflection surface of the right angle prism PA" of the wide-angle lens in the imaging system A.

The distance: d2 indicates "a distance on the optical axis between an entrance pupil and the reflection surface of the prism PB" of the wide-angle lens in the imaging system B.

In the following, "f" indicates a focal length of an entire system, "No" indicates an F-number, and "ω" indicates a field angle.

"The surface numbers" are 1 to 23 from the object side, these numbers indicate a lens surface, incident and emission surfaces and a reflection surface of a prism, an aperture stop surface, and a filter surface or an imaging surface of an imaging sensor.

"R" indicates a curvature radius of each surface, and indicates a "paraxial curvature radius" as an aspherical surface.

"D" indicates a surface interval, "Nd" indicates a refractive index of the d line, and "vd" indicates an Abbe's number. Further, an object distance is infinitely distant. A unit of an amount having a level of length is "mm".

SPECIFIC EXAMPLE f=0.75, No=2.14, ω=190 degrees

| SURFACE NUMBER | R | D | Nd | vd |
|---|---|---|---|---|
| 1 | 17.1 | 1.2 | 1.834807 | 42.725324 |
| 2 | 7.4 | 2.27 | | |
| 3* | −1809 | 0.8 | 1.531131 | 55.753858 |
| 4* | 4.58 | 2 | | |
| 5 | 17.1 | 0.7 | 1.639999 | 60.078127 |
| 6 | 2.5 | 1.6 | | |
| 7 | ∞ | 0.3 | | |
| 8 | ∞ | 5 | 1.834000 | 37.160487 |
| 9 | ∞ | 1.92 | | |
| 10 | ∞(APERTURE STOP) | 0.15 | | |
| 11 | 93.2 | 1.06 | 1.922860 | 18.896912 |
| 12 | −6.56 | 1.0 | | |
| 13 | 3.37 | 1.86 | 1.754998 | 52.321434 |
| 14 | −3 | 0.7 | 1.922860 | 18.896912 |
| 15 | 3 | 0.3 | | |
| 16* | 2.7 | 1.97 | 1.531131 | 55.753858 |
| 17* | −2.19 | 0.8 | | |
| 18 | ∞ | 0.4 | 1.516330 | 64.142022 |
| 19 | ∞ | 0 | | |
| 20 | ∞ | 0.3 | 1.516330 | 64.142022 |
| 21 | ∞ | 0.3 | | |
| 22 | IMAGING SURFACE | | | |

Aspherical Surface

Surfaces having "*" (both surfaces of the second lens in the front group and both surfaces of the final lens in the rear group) in the data above are aspherical surfaces.

An aspherical surface shape is represented by the following well-known equation.

$$X = CH^2/[1+\sqrt{\{1-(1+K)C^2H^2\}}] + A4 \cdot H^4 + A6 \cdot H^6 + A8 \cdot H^8 + A10 \cdot H^{10} + A12 \cdot H^{12} + A14 \cdot H^{14}$$

In this equation, "C" indicates a reciprocal number of a paraxial curvature radius (paraxial curvature), "H" indicates a height from an optical axis, "K" indicates a conical constant, "A1" or the like indicates an aspherical surface coefficient of each order, and "X" indicates an aspherical surface amount in the optical axis direction.

The shape is specified by applying the paraxial curvature radius: R, the conical constant: K, and the aspherical surface coefficients: A1 to A14 described above.

Aspherical surface data of the abovementioned example is as follows.

Third Surface
4th: 0.001612
6th: −5.66534e−6
8th: −1.99066e−7
10th: 3.69959e−10
12th: 6.47915e−12
Fourth Surface
4th: −0.00211
6th: 1.66793e−4
8th: 9.34249e−6
10th: −4.44101e−7
12th: −2.96463e−10
16th Surface
4th: −0.006934
6th: −1.10559e−3
8th: 5.33603e−4
10th: −1.09372e−4
12th: 1.80753−5
14th: −1.52252e−7
17th Surface
4th: 0.041954
6th: −2.99841e−3
8th: −4.27219e−4
10th: 3.426519e−4
12th: −7.19338e−6
14th: −1.69417e−7

In the indication of the abovementioned aspherical surfaces, for example "−1.69417e−7" means "1.69417×10−7".

Moreover, "4th to 14th" mean "A4 to A14", respectively.

The wide-angle lens in the example satisfies "d1=d2=d=6 mm".

Moreover, a distance from the lens surface nearest to the object side to the reflection surface of the right angle prism: DA satisfies DA=8.87 mm.

Accordingly, if the reflection surfaces are made to be common in the two wide-angle lenses, a distance on the optical axis between the surfaces nearest to the object side of the front groups of the two wide-angle lenses is 8.87×2=17.74 mm.

From this distance, a distance between maximum field angles of 17 mm is obtained.

A parallax: θ in a case of the distance between maximum field angles: 17 mm is "2.4 degrees" as illustrated in FIG. 3, and the "shift amount" of the infinitely distant image is also reduced to 24 pixels.

Moreover, the reflection surfaces are made to be common to decrease the interval between the principal points of the two wide-angle lenses as d1+d2=2d1. This also contributes to reduction of the parallax.

Figure 4:
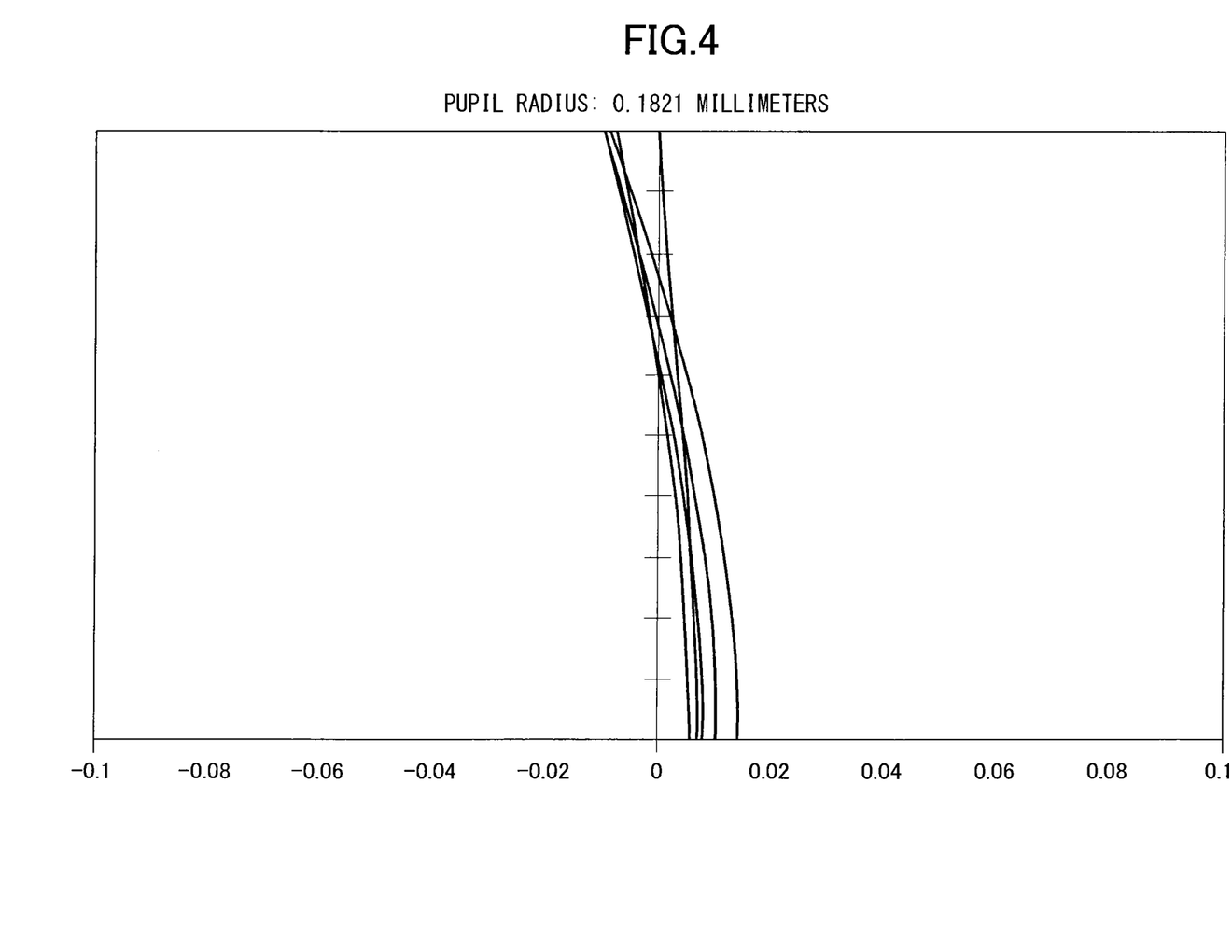
FIG. 4 is a view of a spherical aberration of a specific example of a wide-angle lens.
Figure 5:
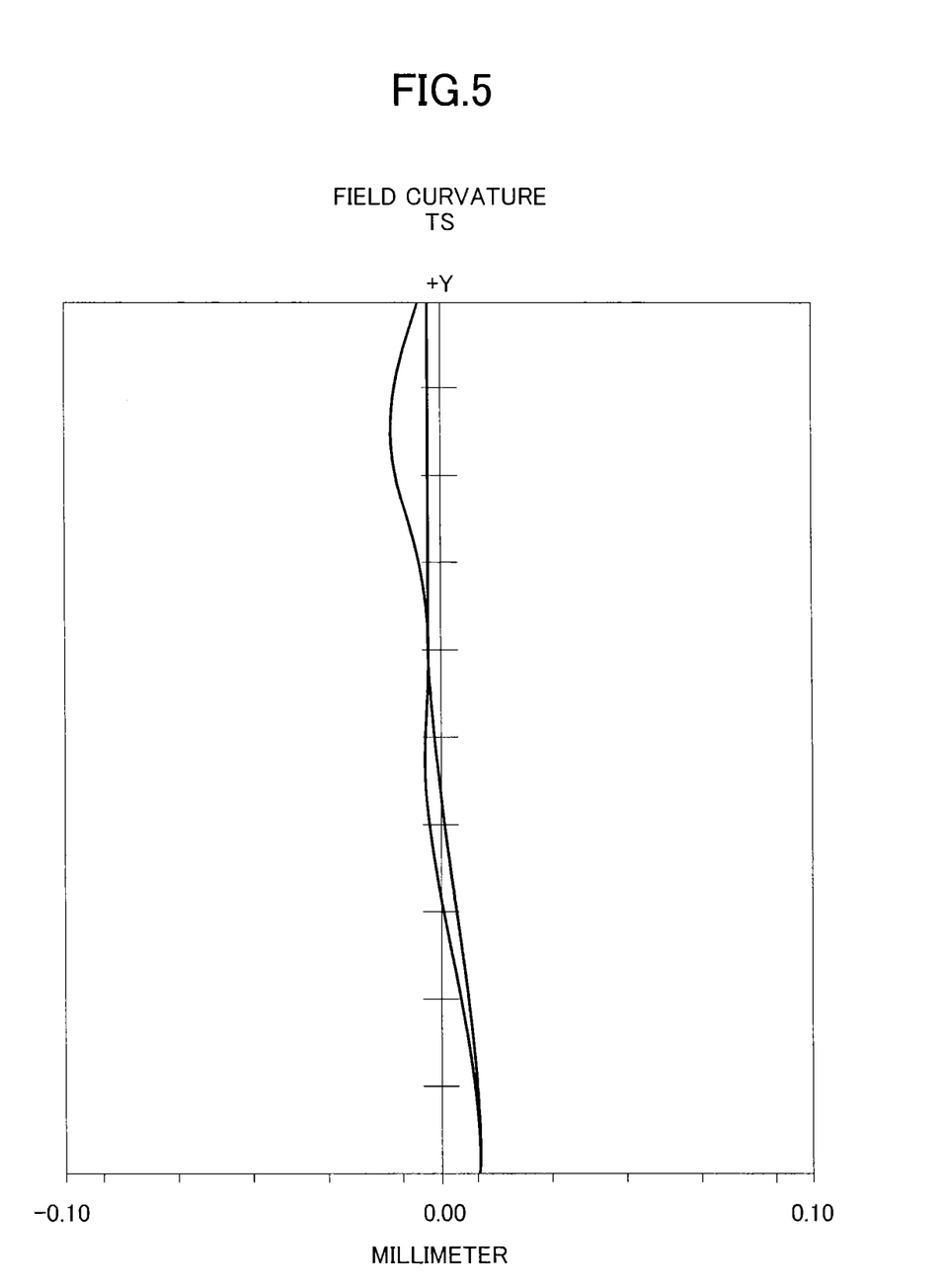
FIG. 5 is a view of curvature of field of the specific example of the wide-angle lens.
Figure 6:
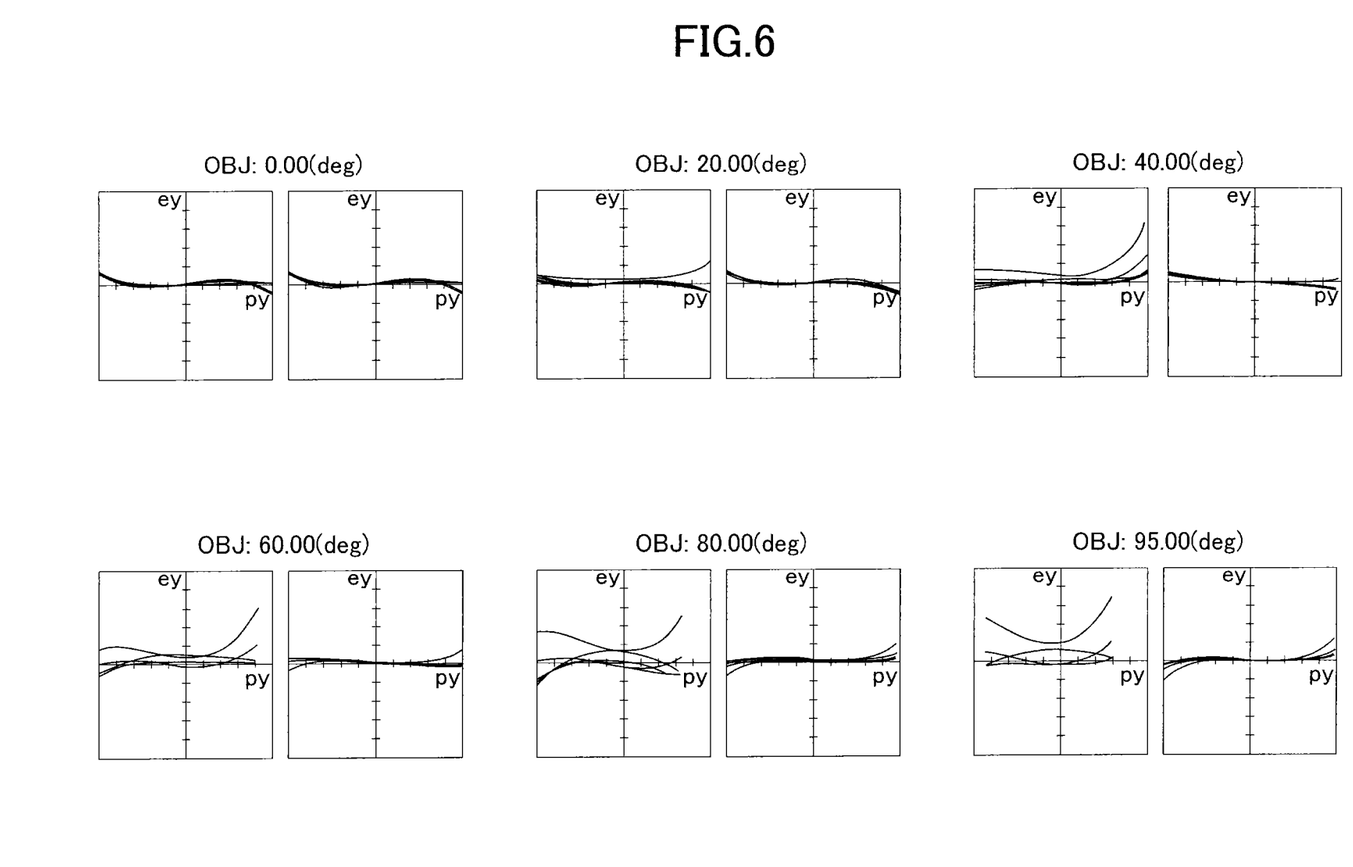
FIG. 6 is views of coma aberration of the specific example of the wide-angle lens.

FIG. 4 illustrates a view of spherical aberration of the wide-angle lens in the abovementioned specific example. Moreover, FIG. 5 illustrates a view of the curvature of field. FIG. 6 illustrates views of coma aberration.

Figure 7:
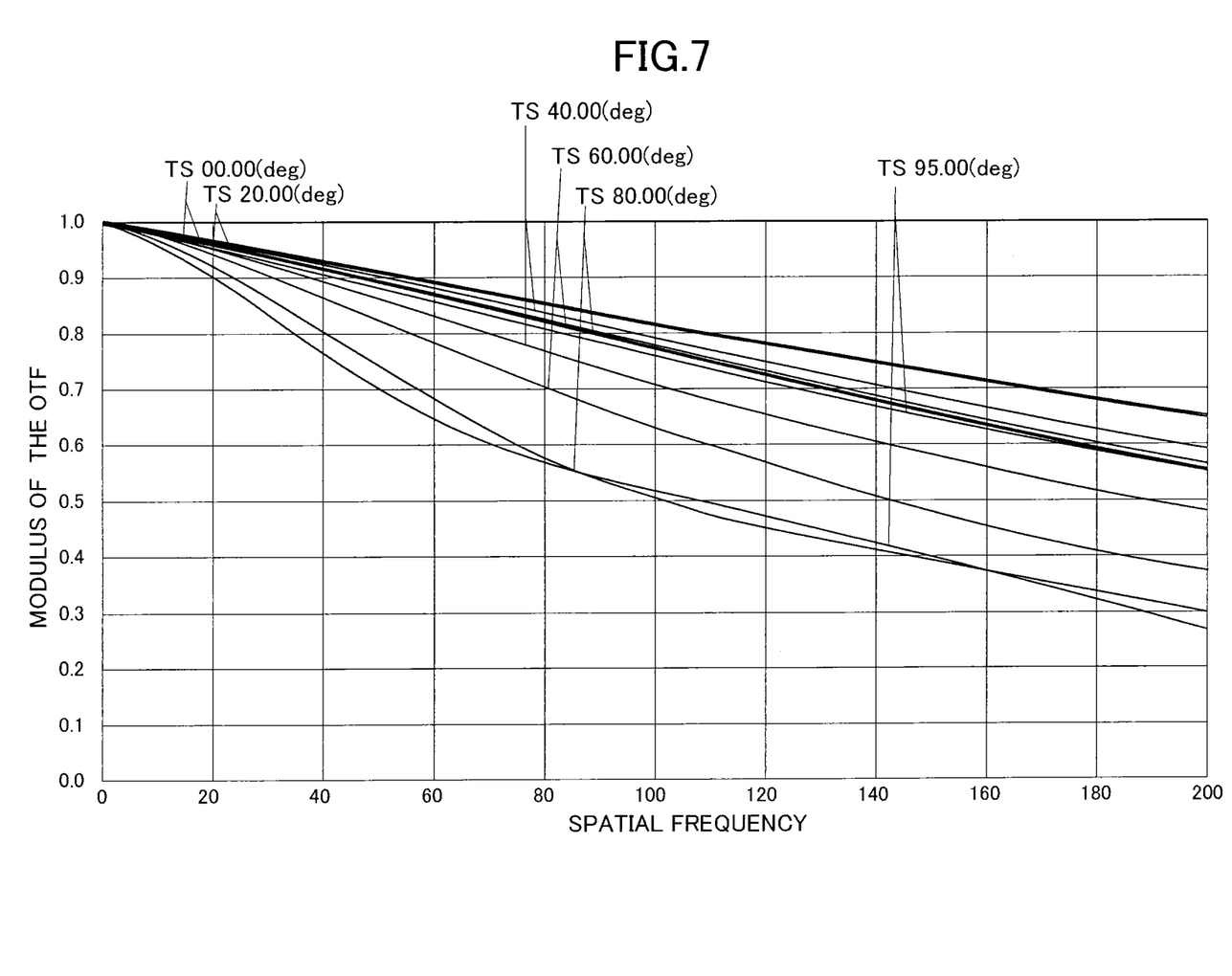
FIG. 7 is a graph illustrating an OTF feature of the specific example of the wide-angle lens.
Figure 8:
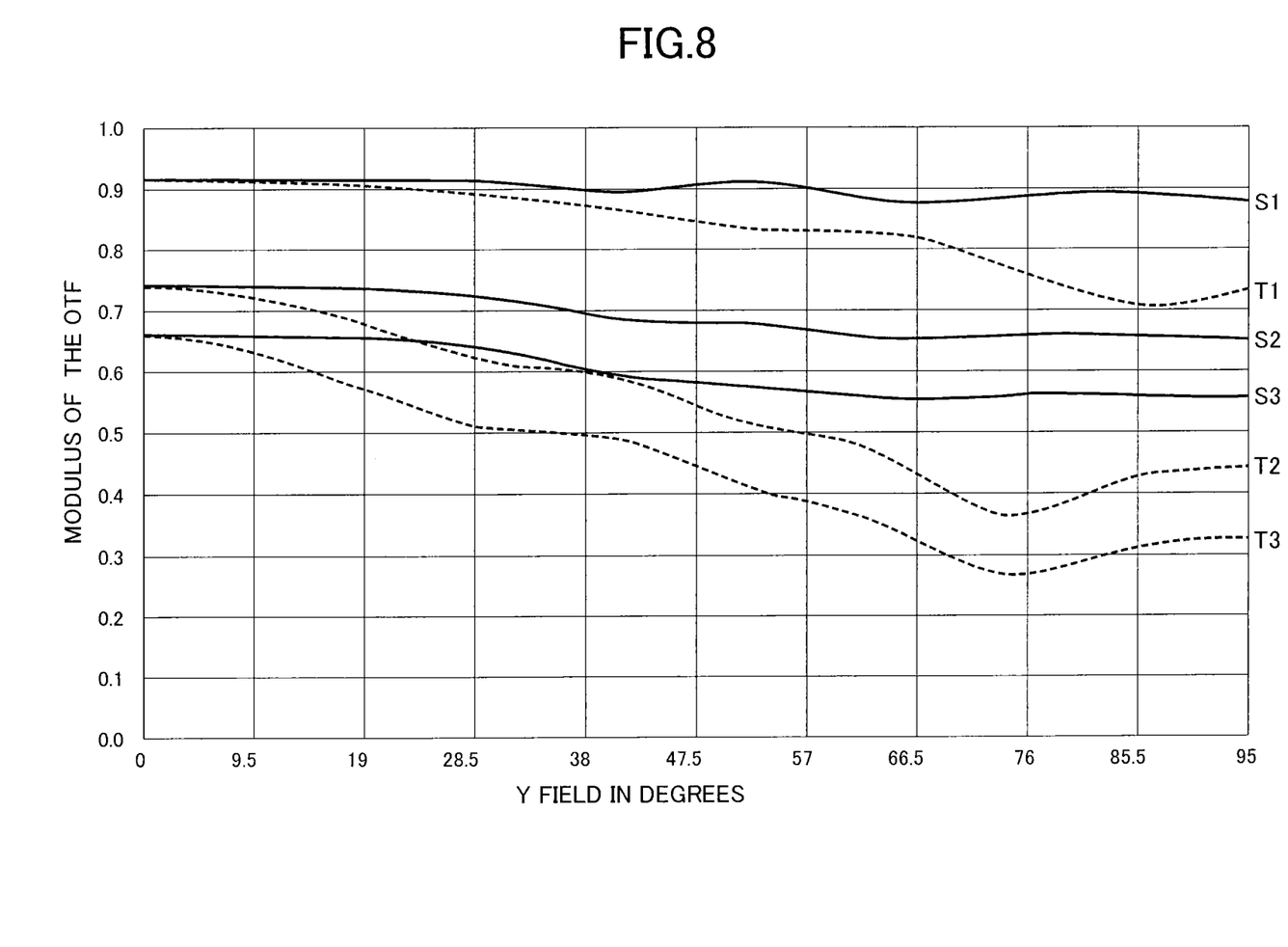
FIG. 8 is another graph illustrating an OTF feature of the specific example of the wide-angle lens.

FIG. 7 and FIG. 8 are views each illustrating an OTF (Optical Transfer Function) feature, the horizontal axis indicates a "spatial frequency" in FIG. 7 and a half field angle with "degrees" in FIG. 8.

As is apparent from these drawings, the wide-angle lens in the specific example has an extremely high performance.

In this manner, the reflection surfaces of the two wide-angle lenses included in the image capture system are made to be common, and the common reflection surface is sandwiched by the two transparent members (right angle prisms PA, PB) to be integrally formed as a reflection surface member.

Accordingly, as explained the above, the parallax can be effectively reduced.

However, the following is required to be noted because the reflection surfaces are made to be common.

In other words, if the each of the wide-angle lenses includes a reflection surface separately, each reflection surface may be ensured for the position accuracy with respect to the front group and the rear group in one wide-angle lens.

However, if the reflection surfaces are made to be common in the two wide-angle lenses, the reflection surface made to be common required to be ensured for the positional relationship of the front group and the rear group with respect to the respective two wide-angle lenses.

In other words, an inclination or a position error of the reflection surface affects on the two wide-angle lenses.

A reflection film serving as the reflection surface is integrally formed with the right angle prisms PA, PB to be one reflection surface member, and the performance of thereof depends on one optical element due to the assembly.

This problem can be solved as follows.

In other words, a reflection film made to be common to the two wide-angle lenses is sandwiched by optically equivalent two transparent members.

The two transparent members which sandwich the reflection film therebetween have "surfaces of different sizes which abut on the reflection film", and a "region out of a light flux reflection region" in one of the surfaces having a larger abut area is set as a free surface part.

The free surface part is "the surface the same as the reflection surface" if a minute film thickness of the reflection film is ignored.

Therefore, an abutting surface which abuts on the free surface part is formed on the lens barrel which holds the reflection surface member, and the free surface part is caused to abut on this abutting surface, thereby aligning the abutting surface with respect to the lens barrel.

This enables the reflection surface to be "directly aligned" with respect to the lens barrel.

Meanwhile, the front groups and the rear groups of the two wide-angle lenses are aligned with high accuracy and mounted to the lens barrel.

Accordingly, as described the above, the reflection surface of the reflection surface member mounted to the lens barrel is aligned to the respective two wide-angle lenses with high accuracy.

This applies to the embodiment being explained as follows.

Figure 9:
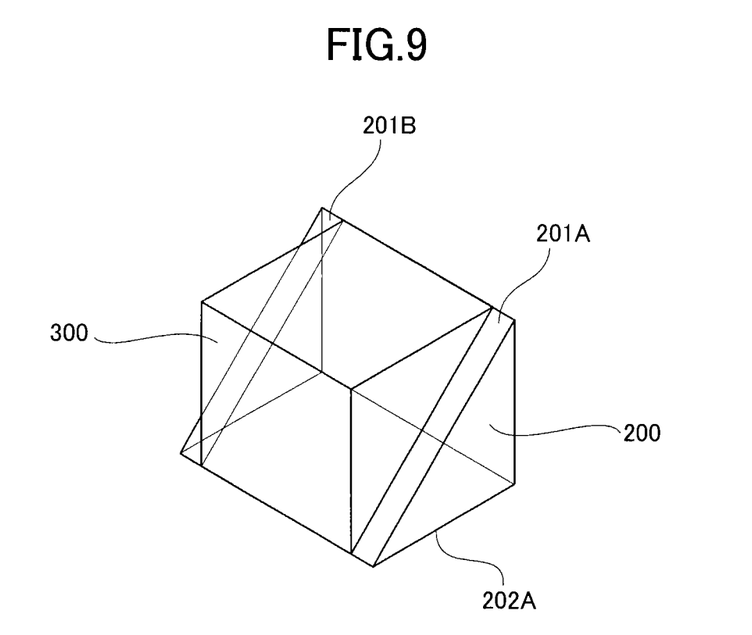
FIG. 9 is a view illustrating an example of a reflection surface member.

FIG. 9 is a view for explaining the reflection surface member. For simplified explanation, reference numerals 200 and 300 indicate the two right angle prisms.

The right angle prisms 200, 300 are used in the specific example of the abovementioned wide-angle lenses, are formed of the same material having a refractive index: 1.834 and an Abbe's number: 37.160487.

A reflection film is formed by aluminum coating on inclined surfaces of the right angle prisms 200, 300. Note that, the "reflection film" is not illustrated for simplified illustration.

The inclined surfaces of the right angle prisms 200, 300 are bonded and fixed to each other by an adhesive in an interval or 5 μm or less with the reflection films therebetween.

Two prism planes forming a prism angle of each of the right angle prisms 200, 300 are "an incident surface and a reflection surface", and reflection prevention is processed to these surfaces.

The right angle prism 200 out of the right angle prisms 200, 300 has "a length in a ridge line direction of the prism planes together forming a right angle" longer than that of the right angle prism 300.

This causes parts of the inclined surface of the right angle prism 200 (both end sides portions in the abovementioned ridge line direction) to be projected out from the inclined surface of the right angle prism 300.

In FIG. 9, portions indicated by reference numerals 201A, 201B are the "protruded portions", that is the "free surface parts". The free surface parts 201A, 201B are the same surfaces as the "reflection surfaces".

Figure 10A:
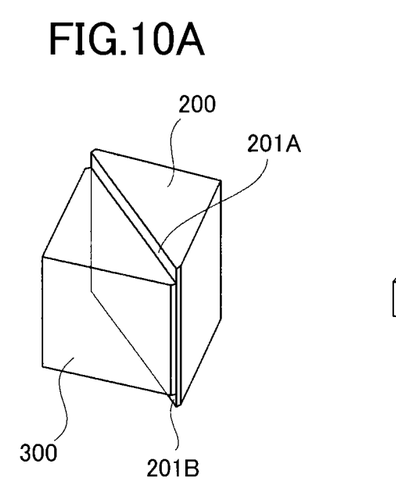
FIGS. 10A and 10B are views for explaining the reflection surface member and an assembly thereof to a lens barrel.

FIG. 10A is a view illustrating the reflection surface member being placed in such a manner that the abovementioned "ridge line direction" becomes a vertical direction. The reflection surface member is mounted to the lens barrel in this state.

Note that, in FIG. 10A, end portions of a jointing surface between the right angle prisms 200, 300 of the reflection surface member are "chamfered".

Figure 10B:
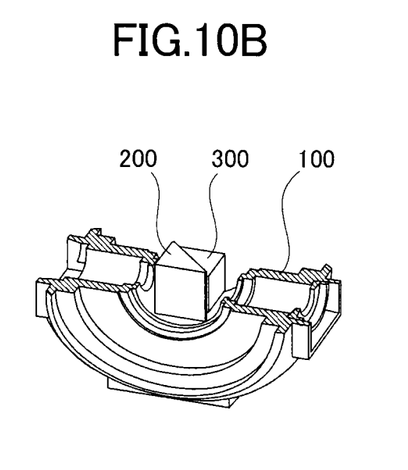

FIG. 10B illustrates a state where the reflection surface member is attached to a lens barrel 100 as an explanation view. The lens barrel 100 is cut by a virtual plane including the optical axis in the rear group and in parallel with the optical axis of the front group.

Figure 11A:
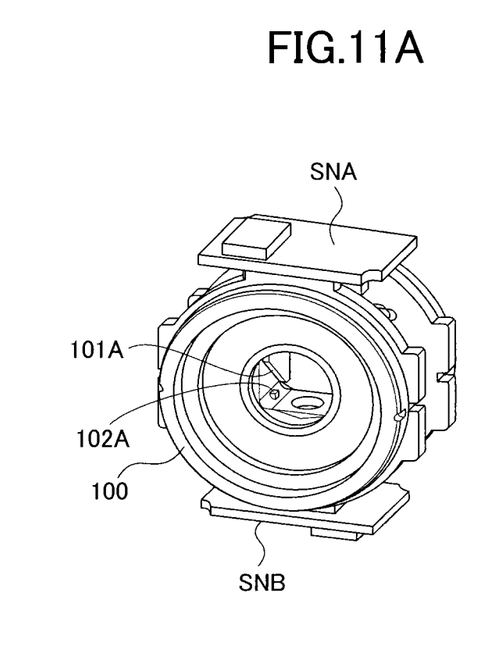
FIGS. 11A and 11B are views for explaining the lens barrel.
Figure 11B:
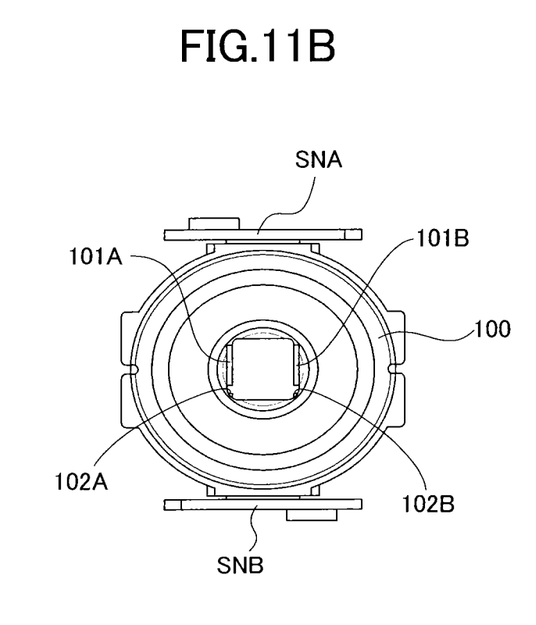

Each of FIGS. 11A and 11B illustrates a portion in the lens barrel 100 to which the reflection surface member is attached.

FIG. 11A is a perspective view, and FIG. 11B is a front view.

The vertical direction in the front view of FIG. 11B is "the optical axis direction of the rear groups of the two wide-angle lenses", and the respective front groups are mounted to a hole portion in the lens barrel 100 in a direction orthogonal to the drawing.

The lens barrel 100 is formed with steps at portions which receive the reflection surfaces of the reflection surface member, and surfaces of the steps are abutting surfaces 101A, 101B.

The abutting surfaces 101A, 101B are formed with high accuracy in association with the positions and the postures of the respective front groups and rear groups of the two wide-angle lenses mounted to the lens barrel 100 as "reflection surface positions".

The free surface part 201A and the free surface part 201B in the reflection surface member constituted from the right angle prisms 200, 300 are respectively abutted on the abutting surface 101A and the abutting surface 101B.

This allows the reflection surfaces of the reflection surface member to be set a required posture with respect to the front groups and the rear groups of the respective wide-angle lenses.

With the manner as described the above, the postures of the reflection surfaces are determined. Meanwhile, the reflection surface member in this state has a flexibility of movement in "a direction along the reflection surface".

In order to decide a position of the reflection surface member in the lens barrel 100 while the postures of the reflection surfaces being held adequately, at least one point other than the free surface parts 201A, 201B needs to be fixed.

In the embodiment being explained, an emission surface 202A of the right angle prism 200 is abutted on second abutting surfaces 102A, 102B formed on the lens barrel as protruding parts and is bonded thereto by an adhesive.

In this manner, the right angle prism 200 is fixed to the lens barrel 100, and the posture of the reflection surface member with respect to the lens barrel 100 is decided.

In the embodiment being explained, although two protruding parts are provided in the lens barrel 100 as the second abutting surfaces 102A, 102B, at least one of the second abutting surfaces 102A, 102B may be provided.

In the embodiment being explained, the emission surface 202A of the right angle prism 200 is bonded to the second abutting surfaces 102A, 102B. This means as follows.

Figure 12:
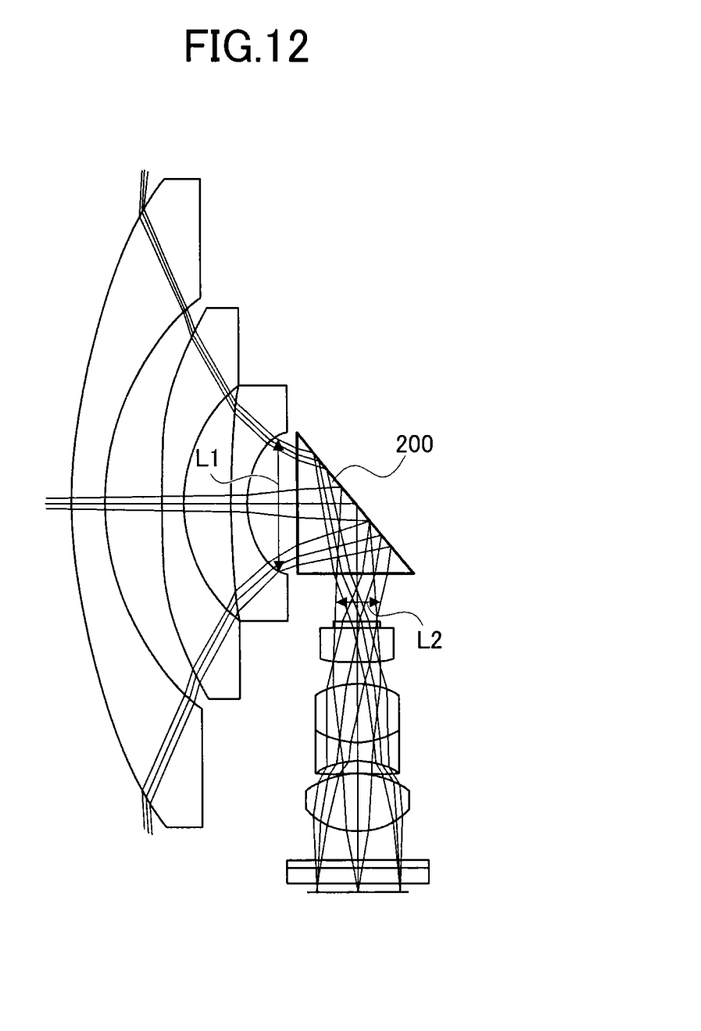
FIG. 12 is a view illustrating a relation between right angle prisms which constitute the reflection surface member and an image formation light flux.

FIG. 12 illustrates an optical path view of the imaging system which constitutes the image capture system (the imaging system A illustrated in FIG. 1). A light flux entered from the front group with the reduced light flux diameter enters into the right angle prism 200.

Then, the light flux is further narrowed in the right angle prism 200 and emitted from the emission surface. Accordingly, the light flux diameter of the image formation light flux (light flux effective diameter) is large in the incident surface, and small in the emission surface.

Therefore, of the right angle prism 200 out of the two right angle prisms which sandwich the reflection film therebetween, a portion out of the light flux effective diameter in the emission surface 202A having a small light flux effective diameter is abutted on the second abutting surfaces.

In this manner, an outer circumference portion of the image formation light flux might not be light-blocked by the protruding parts as the second abutting surfaces 102A, 102B.

Specifically, in FIG. 12, the light flux diameter: L1 is 3.8 mm and L2 is 2.3 mm, and the length of one side of the incident and emission surfaces of the right angle prism 200 is 5 mm.

In this manner, a part where the reflection surface member is fixed to the lens barrel is made to be the reflection surface.

Accordingly, the sizes of the right angle prisms change, and the free surface part is provided on the reflection surface of the larger right angle prism and is abutted on the abutting surface of the lens barrel.

This allows the cause of deterioration in a performance resulting from a shift or a tilt of the reflection surface to be reduced without affection by the outer accuracy of the reflection surface member.

Although a case where two right angle prisms are combined as a reflection surface member has been described above, optically equivalent two transparent members which sandwich the reflection film made to be common therebetween are not limited to the right angle prisms.

For example, transparent parallel plates may be used as optically equivalent two transparent members, and may sandwich the reflection film therebetween.

Also in this case, one of the transparent parallel plates is made to be large to form a free surface part on an extended portion of the reflection surface, and the free surface part is made to be abutted on the abutting surface, thereby deciding a position of the transparent parallel plates.

In principle, when the reflection film is sandwiched by the abovementioned two transparent parallel plates, there is a method of achieving a position accuracy of the reflection surface without a free surface part being not formed on the extended portion of the reflection surface.

In other words, it is considered to achieve the position accuracy in such a manner that the surface at the side not in contact with the reflection surfaces of the transparent parallel plates is abutted on the abutting surface of the lens barrel.

In this case, when the thickness of the transparent parallel plates is "t", the abutting surface of the lens barrel is formed at a position moved in parallel by "t" in the vertical direction from an ideal position of the reflection surface.

However, in this method, the position accuracy of the reflection surface might be affected by the degree of parallel of the transparent parallel plates or an error in thickness because the alignment is not performed using the reflection surface itself.

With the omnidirectional image capture system according to an embodiment of the present invention, each of the wide-angle lenses of the two imaging systems to be combined includes a reflection surface between the front group and the rear group, the reflection surfaces are made to be common to the two imaging systems.

This reduces an interval between "lenses nearest to the object side in the front groups" of the two wide-angle lens to be combined, thereby reducing a "distance between maximum field angles" of the two wide-angle lenses.

This achieves not only a small-sized image capture system but also reduced parallaxes of an object in a maximum field angle and an infinitely distant object, thereby achieving an easy design condition of wide-angle lenses.

Moreover, a shift on the imaging element on the basis of the parallax can be reduced.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An optical system comprising:
a first lens to focus incident light;
a first prism including a reflection surface by which light having transmitted through the first lens is reflected;
a second lens to focus incident light from a different direction from a direction of the incident light on the first lens; and
a second prism including a reflection surface by which light having transmitted through the second lens is reflected, wherein
the reflection surface of the first prism and the reflection surface of the second prism oppose each other.

2. The optical system according to claim 1, wherein the reflection surface of the first prism and the reflection surface of the second prism are close to each other.

3. The optical system according to claim 2, wherein the reflection surface of the first prism and the reflection surface of the second prism are joined with each other.

4. The optical system according to claim 3, further comprising:
- a third lens to guide the light emitted from the first prism; and
- a fourth lens to guide the light emitted from the second prism.

5. An image capture system comprising:
- the optical system according to claim 4; and
- an imaging sensor to photoelectrically convert the light from the optical system.

6. The image capture system according to claim 5, further comprising
- a lens barrel in which the first lens and the second lens are mounted, wherein:
- the reflection surface of the first prism is larger than the reflection surface of the second prism; and
- the reflection surface of the first prism is held at a portion not joined with the second prism by the lens barrel.

* * * * *